United States Patent [19]
Sasaki et al.

[11] Patent Number: 5,208,002
[45] Date of Patent: May 4, 1993

[54] METHOD OF PRODUCING ALKALI METAL AZIDES

[75] Inventors: Masanori Sasaki, Tokyo; Hiroshi Shibafuchi, Yokohama; Yasushi Imai, Hiratsuka; Masahiko Yoshida, Tokyo; Kazuyoshi Miyata, Uozu, all of Japan

[73] Assignee: Nippon Carbide Kogyo Kabushiki Kaisha, Tokyo, Japan

[21] Appl. No.: 882,959

[22] Filed: May 14, 1992

[30] Foreign Application Priority Data

May 17, 1991 [JP] Japan .................................. 3-140688

[51] Int. Cl.$^5$ ............................................ C01B 21/08
[52] U.S. Cl. ..................................................... 423/410
[58] Field of Search .......................................... 423/410

[56] References Cited

U.S. PATENT DOCUMENTS 1,628,380  5/1927  Wilcoxon et al. .................. 423/410
5,098,597  3/1992  Rothgery et al. .................... 423/410

FOREIGN PATENT DOCUMENTS 89-1418  5/1989  Rep. of Korea .

Primary Examiner—Wayne Langel
Attorney, Agent, or Firm—Sherman and Shalloway

[57] ABSTRACT

The method of producing an alkali metal azide involves reaction of hydrazine with an alkyl nitrite in a solvent in the presence of an alkali metal hydroxide. As the solvent is used as aqueous solvent and the reaction ratio of hydrazine is controlled within the range between 50% and 90%. The method can produce with high purities and in high yields alkali metal azides useful as a raw material for the preparation of tetrazoles which can be used as an intermediate material for medicines, as a raw material for the preparation of organic azides useful for light sensitive materials for photo masks employed in the field of electronics industries, or as a major raw material for inflaters used in air bags for cars.

5 Claims, No Drawings

METHOD OF PRODUCING ALKALI METAL AZIDES

BACKGROUND OF THE INVENTION

1. Field of the Invention

The present invention relates to a method of producing alkali metal azides useful as a raw material for the production of tetrazoles which can be used as an intermediate material for medicines, as a raw material for the production of organic azides useful for light sensitive materials for photo masks employed in the field of electronics industries, or as a major raw material for inflaters used in air bags for cars.

2. Description of the Prior Art

It has long since been known to produce alkali metal azides by reacting hydrazine with alkyl esters of nitrous acid in solvents in the presence of alkali metal hydroxides.

For example, U.S. Pat. No. 1,628,380 describes as prior art before the filing day thereof (a) a method in which the aforementioned reaction is conducted in non-anhydrous reaction mediums, and (b) the aforementioned reaction is performed in practically anhydrous reaction mediums.

According to the prior art method, the reaction of the former method (a) is considered to proceed according to reaction scheme-1 below:

$$N_2H_4 \cdot H_2O + RONO + NaOH \rightarrow NaN_3 + ROH + 3 H_2O \quad (1)$$

wherein R represents an alkyl group.

In the case of the above reaction (1), a large amount of sodium azide together with excessive raw materials and one or more by-products is dissolved in the water-bearing or hydrous reaction medium, and hence a mineral acid such as sulfuric acid is added to the reaction solution to generate hydrogen azide according to reaction scheme-2 below:

$$2NaN_3 + H_2SO_4 \rightarrow 2HN_3 + Na_2SO_4 \quad (2)$$

and the hydrogen azide thus generated is absorbed with sodium hydroxide to produce sodium azide according to reaction scheme-3 below:

$$HN_3 + NaOH \rightarrow NaN_3 + H_2O \quad (3)$$

However, according to the aforementioned U.S. patent, while the method (a) described above is advantageous in that crude raw material which are less expensive can be used, it requires many steps including a step of distilling hydrogen azide, which is not only dangerous but also involving much loss.

On the other hand, the method (b) described above is considered to proceed according to reaction scheme-4 below:

$$N_2H_4 + RONO + RONA \rightarrow NaN_3 + 2ROH + H_2O \quad (4)$$

wherein R represents an alkyl group.

In this reaction, practically anhydrous raw materials such as alcohols, high concentration hydrazine and sodium ethylate must be used. Therefore, the method is considered dangerous and expensive because it inevitably involves the use of metal sodium in the preparation of sodium ethylate although it is advantageous in that the objective compound, sodium azide, can be isolated by simple filtering because of insolubility of sodium azide in the reaction medium.

The production method described in the U.S. Pat. No. 1,628,380 was intended to combine advantageous features of the conventional methods (a) and (b) described above, and hence is characterized by reacting a hydrazine hydrate, an alkyl nitrite and a sodium alcoholate solution together.

According to the example of U.S. Pat. No. 1,628,380, 1 kg of aqueous hydrazine solution containing 500 g (15.6 moles) of hydrazine, 7.49 kg of a solution of 7.5% by weight sodium hydroxide in anhydrous ethanol, and 1.76 kg of ethyl nitrite were reacted to obtain 0.8 kg of sodium azide of a purity of 90% by weight or more. The yield of the product of this reaction amounts to only 79% based on the weight of hydrazine used as raw material, even if the purity of sodium azide thus obtained was assumed to be 100% by weight.

According to the description on page 2, lines 25 to 32 and claim 4 of the U.S. patent, the concentration of hydrazine in the aqueous hydrazine solution used should be high enough so that the proportion of hydrazine to water can be maintained at least 1 unit of hydrazine to 3 units of water including the water generated in the reaction. According to the aforementioned example of the prior art a relatively large amount of the ethanol solution as much as 7.49 kg as compared to 1 kg of the aqueous hydrazine solution is used, and hence the solvent used in the reaction system described in U.S. Pat. No. 1,628,380 is an alcoholic solvent composed of a smaller proportion of water and a larger proportion of an alcohol.

As stated above, the proposal described in the aforementioned U.S. patent uses an alcoholic solvent containing a very small amount of water as the reaction solvent, and basically relates to improvement of the latter method (b) to the prior art relative to the invention described in the U.S. patent, and it is recommended to perform the reaction in reaction systems in which contamination of water has been minimized as far as possible practically. Therefore, when the production method is used industrial production, the method must involve additional steps of recovering the solvent used, purifying it and dehydrating it. Further, yield is not always sufficient. As a result, the production method is disadvantageous practically.

As stated above, the conventional industrial production method of producing alkali metal azides from hydrazine have the following defects:

(1) The use of anhydrous alcohols as the solvent involves cost for recovering the solvents;

(2) Non-recovered solvents (i.e., loss of solvents) causes increase in the production cost of the product;

(3) Special installation is needed for handling combustible solvents;

(4) Yield of the product for hydrazine is not always sufficient; and the like.

SUMMARY OF THE INVENTION

The present inventors have conducted intensive research with view to developing a method of producing alkali metal azides which method is free of the aforementioned defects, and as a result it has now been found that upon reaction of hydrazine with methyl nitrite in an aqueous solvent the use of which has heretofore been considered to be disadvantageous in yield, purity and the like in the presence of sodium hydroxide, the concentration of sodium azide in the aqueous reaction solution increases while the reaction ratio (conversion) of hydrazine is reaching 90%, but the concentration of sodium azide rather decreases while the reaction ratio of hydrazine is increasing above 90% because generation of nitrogen gas and by-production of sodium nitrite occur remarkably, resulting in that not only the selectivity of sodium azide based on the amount of hydrazine consumed but also the purity of sodium azide obtained decreases, and that sodium azide can be produced at a high selectivity as high as about 95% based on the amount of hydrazine consumed by controlling the reaction ratio to 50 to 90%.

The sodium azide in the reaction solution can readily be isolated by concentrating the solution to form crystals and filtering the crystals in a conventional manner. While hydrazine remaining in the filtrate may be recovered by a conventional method such as distillation after diluting the filtrate with water, if desired, the filtrate, which still contains a portion of sodium azide produced, may also be reused by adding thereto sodium hydroxide and hydrazine to adjust the composition, with the result that sodium azide can be obtained in a higher yield.

According to the present invention, there is provided a method of producing an alkali metal azide by reacting hydrazine with an alkyl nitrite in a solvent in the presence of an alkali metal hydroxide, wherein said solvent is an aqueous solvent and reaction ratio of hydrazine is controlled within the range between 50% and 90%.

DETAILED DESCRIPTION OF THE INVENTION

Hereafter, the method of the present invention will be described in detail.

Hydrazine used in the present invention is not limited particularly and may be anhydrous or non-anhydrous. In the case of non-anhydrous hydrazine, it may be in the form of an aqueous hydrazine solution with a hydrazine content of 64% by weight or less. While it is possible to use an aqueous hydrazine solution with a hydrazine content on the order of 5% weight, it is preferred to use an aqueous hydrazine solution with a hydrazine content of 30% by weight or more, and particularly 50% by weight or more.

The method of adding hydrazine is not limited particularly and hydrazine may be added in various methods including a method in which it is added in the lump at the initial stage of the reaction, a method in which it it added dividedly, a method in which it is added in succession, and the like. However, it is preferred to add hydrazine in the lump at the initial stage of the reaction from the viewpoint of ease of reaction operation and the like.

The alkyl nitrite which can be used in the method of the present invention is not limited particularly and any alkyl nitrite may be used. Generally, nitrous acid esters of alcohols having 1 to about 5 carbon atoms, preferably 1 or 2 carbon atoms are used.

As such an alkyl nitrite, there can be cited, for example, methyl nitrite, ethyl nitrite, n-propyl nitrite, isopropyl nitrite, n-butyl nitrite, isobutyl nitrite, sec-butyl nitrite, tert-butyl nitrite, n-amyl nitrite, isoamyl nitrite, tert-amyl nitrite, etc.

Among the aforementioned alkyl nitrites, in the case of those having low boiling points such as methyl nitrite and ethyl nitrite, gas generated can be introduced as it is in the reaction system for producing alkali metal azides. In the case of those which are liquid at room temperature such as n-butyl nitrite can be added to the reaction system by a divisional addition method, a successive dropwise addition method, or the like.

While the alkyl nitrites can be selected appropriately taking into consideration the type of the reaction apparatus used, costs incurred and the like, the use of methyl nitrite is most preferred from the viewpoint of ease of handling and the like.

The amount of the alkyl nitrite depends closely on the reaction ratio of hydrazine and hence, from the necessity of controlling the reaction ratio of hydrazine, it is preferred to use generally 0.9 mole or less, preferably 0.8 mole or less, and more preferably 0.6 to 0.75 mole of alkyl nitrites per mole of hydrazine.

As the alkali metal hydroxide which can be used in the method of the present invention, there can be cited, for example, lithium hydroxide, sodium hydroxide, potassium hydroxide, etc.

Since the kind of the alkali metal azide produced depends on the kind of the alkali metal hydroxide, the alkali metal hydroxide is selected appropriately depending on what alkali metal azide is desired. Generally, it is preferred to use sodium hydroxide since it is easily available.

Since aqueous solvents are used as the reaction solvent in the method of the present invention, the amounts of water contained in raw materials are not limited particularly. For example, the aforementioned alkali metal hydroxide can be used in the form of an aqueous solution, and in the case of sodium hydroxide, for example, 25% by weight aqueous solution or 35% by weight aqueous solution may be used as it is. Also, there can be used aqueous solutions having lower concentrations than the aforementioned aqueous solutions, and solid alkali metal hydroxides as well.

The amount of the alkali metal hydroxides used is preferably at least equimolar to the alkali metal azide produced. In the industrial scale production, it is preferred to add the alkali metal hydroxide in an amount of 1 to 4 moles more preferably 1 to 1.5 moles, per mole of hydrazine used. If the amount of the alkali metal hydroxide is smaller than 1 mole per mole of hydrazine, side reaction between hydrazine and the alkyl nitrite tends to occur while the amount of the alkali metal hydroxide being excessively, i.e., above 4 moles per mole of hydrazine, is undesirable since side reactions between the alkali metal hydroxide and the alkyl nitrite tend to occur, resulting in that the selectivity of alkali metal azide produced decreases in the both cases.

The method of producing alkali metal azides according to the present invention features that the reaction is carried out in an aqueous solvent as described above.

The term "aqueous solvent" as used herein refers to a solvent system composed of water and an optional water-miscible organic solvent.

The water content of the aqueous solvent used the method of the present invention is preferably 50% by weight or more, and more preferably 70 to 95% by weight, and most preferably 80 to 90% by weight at the time of completion of the reaction.

As the water-miscible organic solvent, there can be cited, for example, lower alcohols such as methyl alcohol, ethyl alcohol, and isopropyl alcohol; ketones such as acetone and methyl ethyl ketone; cyclic ethers such as 1,3-dioxane and 1,4-dioxane, and tetrahydrofuran; other water-soluble organic solvents such as dimethylformamide, dimethylacetamide, and dimethyl sulfoxide; and the like.

One of embodiments practicing the method of producing alkali metal azides according to the present invention advantageously on an industrial scale is a method in which after alkali metal azide is separated and collected from the reaction solution, remaining solution containing unreacted hydrazine is recycled and used again for reaction with alkyl nitrite and alkali metal hydroxide, as in Example 2 described later on. In such a case, the aforementioned remaining solution contains the alcohol produced according to the reaction scheme-1 above, and the remaining solution which is recycled may still contain a minute amount of alcohol even if the alcohol is recovered by distillation, if required.

According to another embodiment of the present invention, in order to increase the reaction rate of the reaction according to the scheme-1 above by increasing the degree of dispersion or dissolution of the nitrous acid ester as raw material, the aforementinoed water-miscible organic solvent can be added positively to the aqueous solution of raw material supplied to the reaction system as described in Example 3 described later on.

The water content of the aqueous solution used in the method of the present invention is preferably 50% by weight or more, more preferably 70 to 95% by weight, and most preferably 80 to 90% by weight, as measured at the time when the reaction is completed.

One feature of the method of producing alkali metal azides according to the present invention is to control the reaction ratio of hydrazine to 50 to 90%, preferably 55 to 80%, and more preferably 60 to 75%, as described above.

Here, the term "reaction ratio of hydrazine" refers to a proportion of hydrazine consumed by the reaction to total hydrazine supplied to the reaction system (in the case of the recycle method, sum of hydrazine contained in the filtrate or the like to be recycled and newly added hydrazine).

If the reaction ratio of hydrazine is so high as to exceed 90%, the alkali metal azide produced in the reaction system will be consumed by side reaction with the alkyl nitrite. On the other hand, the reaction ratio as low as below 50% is undesirable since the production efficiency of alkali metal azide by the reaction apparatus per unit time decreases.

It is preferred to control the reaction ratio of hydrazine by the amount of the alkyl nitrite added. This is because the molar number of the alkyl nitrite substantially corresponds to the molar number of hydrazine consumed by the reaction.

The reaction temperature is not limited particularly. However, if it is too low, the reaction rate becomes low while too high a reaction temperature aggravates the stability of the alkali metal azide produced in the aqueous solution. Therefore, the reaction is controlled to proceed at a temperature within the range of usually 0 to 80° C, and preferably 20 to 50° C.

After completion of the reaction, the reaction solution thus obtained usually contains a small amount of an alkali metal azide deposited with most part of the alkali metal azide being dissolved in the reaction solution, and the reaction solution is concentrated to precipitate the dissolved alkali metal azide, followed by isolation of the precipitates by filtration. The fraction distilled off by concentration is an aqueous solution which contains an alcohol produced by the reaction, and can be recovered as an aqueous alcohol solution by appropriate separation operation such as distillation, concentration, etc.

The alkali metal azide thus obtained has a purity of 99% by weight or more, and its yield is 80% or more based on the amount of hydrazine consumed.

The filtrate is subjected to a step of recovering remaining hydrazine by a conventional method such as distillation after it is diluted with water, if desired, or it is recycled as it is with adding thereto an alkali metal hydroxide and hydrazine to adjust the composition.

Since a portion of the alkali metal azide produced is dissolved in the filtrate, the use of the recycled filtrate results in increase in the yield of the alkali metal azide to 9% or more. Therefore, it is desirable to use the step of recycling when production on an industrial scale is intended.

The reaction may be practiced either in an ordinary batchwise reaction mode or in a recycling reaction mode in which the reaction solution is introduced in an alkyl nitrite absorbing tower. Selection between them may be made taking into consideration production scale and installation factors.

EXAMPLES

Hereafter, the present invention will be described in more detail by examples and comparative example. However, the present invention should not be construed as being limited thereto.

EXAMPLE 1

In a 20-liter four-necked flask A equipped with a stirrer, a gas inlet pipe and a reflux condenser were charged 6.13 liters (8.46 kg, 74.0 moles) of an aqueous 35% by weight sodium hydroxide solution, and 3.82 liters (3.86 kg, 61.8 moles) of an aqueous 51.2% by weight hydrazine solution.

Then, in a 20-liter four-necked flask B equipped with a stirrer and a gas discharge pipe connected to the gas inlet pipe of the flask A were charged 9.37 kg (47.5 moles) of an aqueous 35% by weight sodium nitrite solution, and 1.94 liters (1.54 kg, 47.6 moles) of methyl alcohol having a purity of 99% by weight, and to the resulting mixture was added 3.33 liters (4.66 kg, 23.8 moles) of 50% by weight dilute sulfuric acid at 25° C. using a metering pump with stirring and keeping the temperature at 25° C. to produce methyl nitrite gas, which was successively supplied to the flask A through the discharge gas pipe.

The flask A was kept at 30° C., to which was introduced the gas produced in the flask B through the gas inlet pipe with vigorous stirring to allow the gas to react. The addition of the dilute sulfuric acid took 8 hours. Completion of the reaction in the flask A was defined at a timing 1 hour after completion of the addition of the dilute sulfuric acid in the flask B. The reaction mixture in the flask A was in a state of slurry containing crystals of sodium azide precipitated. The solution portion was extracted from the slurry-like reaction mixture, and measurement was made of the methanol content by gas chromatography (hereafter, also referred to as GC method) to calculate the water content of the aqueous solvent in the solution portion, which was 86.4% by weight.

Measurements of the reaction ratio of hydrazine and selectivity of sodium azide production were made by titration and liquid chromatography, respectively, by collecting a portion of the slurry-like reaction mixture after homogenization by stirring, and adding deionized water to completely dissolve the precipitated sodium azide. The reaction ratio of hydrazine was 70%, and the selectivity of sodium azide production was 95% based on the amount of hydrazine consumed.

Next, the reaction mixture obtained was concentrated. On this occasion, 1.86 liters (1.52 kg, 42.8 moles) of 90% by weight methyl alcohol was recovered as initial distillate, and then the reaction mixture was further concentrated under reduced pressure until the amount of the solution became about ⅓ of the original when the concentration was stopped. Crystals of sodium azide which precipitated were filtered by centrifugation to separate 3.3 kg of filtrate containing unreacted raw materials and 2.44 kg (purity 95% by weight) of crystals containing moisture. The crystals were dried in a vacuum drier kept at 60° C to obtain 2.32 kg of white sodium azide crystals having a purity of 99.8% (35.6 moles; yield based on the amount of hydrazine consumed: 82.4%).

Upon analysis, the filtrate had a composition as shown in Table 1 below.

TABLE 1

| Composition | Content (mole) |
|---|---|
| Hydrazine | 18.2 |
| Sodium hydroxide | 32.9 |
| Sodium azide | 5.5 |
| Sodium nitrite | — |
| Methyl alcohol | — |

EXAMPLE 2: RECYCLING OF REACTION MIXTURE FILTRATE

The same reaction procedure as in Example 1 was repeated as a reaction of the first cycle to obtain 2.47 kg (purity: 95% by weight, 36.1 moles) of sodium azide crystals containing moisture, and an aqueous 90% by weight methyl alcohol solution as initial distillate upon concentration of the reaction mixture and a filtrate containing unreacted raw materials were recovered. Measurement of the methyl alcohol content of the filtrate by a GC method failed, and thus the water content of the aqueous solvent was calculated to be 100% by weight.

Next, the filtrate thus recovered was backed in the flask A, to which were added 4.23 liters (5.83 kg, 51.0 moles) of an aqueous 35% by weight sodium hydroxide solution and 2.68 liters (2.70 kg, 43.2 moles) of an aqueous 51.2% by weight hydrazine solution. This amount corresponded to that consumed in the reaction of the first cycle. Further, in order to balance with the volume of the vessel, the volume of the reaction mixture was adjusted with adding deionized water so that it became the same volume as that at the time of the reaction in the first cycle.

In the flask B was charged the aqueous sodium nitrite solution freshly in the same amount as in Example 1, and then 1.86 liters (1.52 kg, 42.8 moles) of the aqueous methyl alcohol solution recovered in the reaction in the first cycle as initial distillate and 0.192 liter (0.152 kg, 4.7 moles) of methyl alcohol having a purity of 99%. Dilute sulfuric acid was prepared in the same manner as in Example 1, and the reaction was allowed to proceed in the same manner as in Example 1. Upon completion of the reaction, the water content of the aqueous solvent was 86.5% by weight (GC method). Then, the same procedure as in Example 1 were repeated to recover an aqueous 90% methanol solution as initial distillate and obtain sodium azide crystals and a reaction filtrate.

This procedure was repeated 10 times to perform the reaction 11 times in total together with the reaction in the first cycle. The amounts of the reagents additionally charged in the flask A upon the repeated reactions were the same as the aforementioned amounts of the reagents added. Total amount of the crystals containing moisture obtained in the reaction in the first cycle and the 10 times of the repeated reaction was 30.4 kg. Upon drying the crystals thus obtained in the same manner as in Example 1, 29.0 kg (444 moles; yield based on the amount of hydrazine used: 90.0%) of white sodium azide having a purity of 99.5% were obtained.

Table 2 shows amount of additional hydrazine in each reaction cycle, and reaction ratio of hydrazine, selectivity of sodium azide production based on the amount of hydrazine consumed, and yield of hydrazine (mole). Table 2 also shows the water content of the aqueous solvent upon completion of the reaction for each cycle.

TABLE 2

| Number of Reaction Cycle | Hydrazine | | Sodium Azide | | Water Content of Aqueous Solvent (Upon Completion of Reaction) (%) |
|---|---|---|---|---|---|
| | Amount of Addition (mole) | Reaction Ratio (%) | Selectivity (%) | Yield (mole) | |
| 1 | 61.8 | 70 | 95 | 36.1 | 86.4 |
| 2 | 43.2 | 70 | 95 | 39.4 | 86.5 |
| 3 | 43.2 | 70 | 95 | 40.7 | 86.6 |
| 4 | 43.2 | 70 | 95 | 41.0 | 86.5 |
| 5 | 43.2 | 70 | 95 | 41.0 | 86.5 |
| 6 | 43.2 | 70 | 95 | 41.0 | 86.5 |
| 7 | 43.2 | 70 | 95 | 41.0 | 86.5 |
| 8 | 43.2 | 70 | 95 | 41.0 | 86.5 |
| 9 | 43.2 | 70 | 95 | 41.0 | 86.5 |
| 10 | 43.2 | 70 | 95 | 41.0 | 86.5 |
| 11 | 43.2 | 70 | 95 | 41.0 | 86.5 |
| Sum | 493.8 | | | 444.2 | |

Note: The amount of hydrazine upon the initiation of the reaction for each reaction cycle was set to 61.8 moles.

EXAMPLE 3

In a 500-ml four-necked flask A equipped with a stirrer, a gas inlet pipe and a reflux condenser were charged 82.8 ml (114 g, 1.0 mole) of an aqueous 35% by weight sodium hydroxide solution, 62.5 ml (62.5 g, 1.0 mole) of an aqueous 51.2% by weight hydrazine solution, and 74.7 ml (59.0 g, 1.8 moles) of methyl alcohol having a purity of 99% by weight. Then, in a 200 ml fournecked flask B equipped with a dropping funnel having an inner volume of 100 ml, a stirrer and a gas discharge pipe connected to the gas inlet pipe of the flask A were charged 138.0 g (0.7 mole) of an aqueous 35% weight sodium nitrite solution, and 28.4 ml (22.4 g, 0.7 mole) of methyl alcohol having a purity of 99% by weight, and 49 ml (68.6 g, 0.35 mole) of 50% by weight dilute sulfuric acid charged in the dropping funnel was added dropwise with stirring and keeping the temperature at 25° C. to produce methyl nitrite gas, which was successively supplied to the flask A through the discharge gas pipe.

The flask A was kept at a temperature about 30 to 40° C., to which was introduced the gas produced in the flask B through the gas inlet pipe with vigorous stirring to allow the gas to react. The addition of the dilute sulfuric acid in the flask B took about 3 hours. Completion of the reaction in the flask A was defined at a timing 1 hour after completion of the addition of the dilute sulfuric acid in the flask B. The reaction mixture in the flask A was in a state of slurry containing crystals of sodium azide precipitated.

Upon analysis of the slurry-like reaction mixture obtained in the same manner as in Example 1, the water content of the aqueous solvent in the reaction solution was 61.5% by weight, the reaction ratio of hydrazine was 70%, and the selectivity of sodium azide production was 95% based on the amount of hydrazine consumed.

Next, the reaction mixture obtained was concentrated. On this occasion, 88.3 ml (72.2 g, 2.0 moles) of 90% by weight methyl alcohol was recovered as initial distillate, and then the reaction mixture was further concentrated under reduced pressure until the amount of the solution became about ¼ of the original when the concentration was stopped. Crystals of sodium azide which precipitated were washed with about 20 ml of methyl alcohol. The crystals containing moisture thus obtained were dried in a vacuum drier kept at 60° C. to obtain 36.4 g (0.56 mole; yield based on the amount of hydrazine consumed: 80%) of white sodium azide crystals having a purity of 99.8%.

EXAMPLE 4: ABSORPTION TOWER REACTION: METHYL NITRITE

An absorption tower for absorbing alkyl nitrite was constructed by filling Raschig ring made of glass in a height of 20 cm in a Pyrex glass pipe having an inner diameter of 28 mm. Then, a reaction solution composed of 62.8 g (1.00 mole) of 51.2% by weight hydrazine and 193.8 g (1.21 moles) of an aqueous 25 by weight sodium hydroxide solution was prepared, and introduced in the glass tube at the top thereof at a rate of 500 ml/min. The effluent was pumped and circulated again to the top of the glass tube. The reaction temperature was kept at 40° C., and methyl nitrite was introduced at the bottom of the glass tube at a rate of 20 ml/min. expressed as normal state. Then, the methyl nitrite was absorbed completely. The reaction was continued for 13 hours to introduce 0.70 mole of methyl nitrite, and upon completion of the reaction, a very small amount of sodium azide precipitated. The reaction solution was collected and a portion thereof was analyzed by GC method in the same manner as in Example 1, the water content of the aqueous solvent was 90% by weight. Subsequently, the collected reaction solution was concentrated at 40° C. or lower under reduced pressure, crystals precipitated were collected by filtration and dried in vacuum to obtain 38.4 g (0.59 mole) of crystals of sodium azide having purity of 99.8%.

The filtrate was 52.7 g and had a composition as shown in Table 3. Calculating based on the amount of hydrazine consumed, the selectivity of sodium azide production was 95%, and yield based on the amount of hydrazine consumed was 85.5%.

TABLE 3

| Component | Content (mole) |
| --- | --- |
| Hydrazine | 0.31 |
| Sodium hydroxide | 0.55 |
| Sodium azide | 0.07 |
| Sodium nitrite | 0.001 |
| Methyl alcohol | — |

COMPARATIVE EXAMPLE

The reaction was performed in a manner similar to the reaction in Example 1 except that the amounts of the aqueous sodium nitrite solution and methyl alcohol were changed to 13.39 kg (67.9 moles) and 2.77 liters (2.20 kg, 68.1 moles), and the amount of the dilute sulfuric acid was added to 4,756 l (6.659 kg), respectively to obtain a slurry-like reaction mixture containing crystals of sodium azide precipitated. The reaction ratio of hydrazine in this reaction was 98% and the selectivity of sodium azide production was 75% based on the amount of hydrazine consumed.

The reaction solution obtained in the same manner as in Example 1 was concentrated until the volume of the solution became to ⅛ time the original volume to precipitate crystals. The crystals were collected by centrifugal filtration to obtain 2.78 kg of crystals containing moisture, which were then dried in the same manner as in Example 1 to obtain 2.67 kg (yield based on the amount of hydrazine consumed: 67.0%) of white sodium azide having a purity of 98.8%.

The method of producing alkali metal azides according to the present invention incurs lower cost, is much safer and exhibits superior yield based on the amount of hydrazine used than the conventional method using organic solvents such as alcohols.

The method of the present invention performs the reaction between hydrazine and an alkyl nitrite in an aqueous solvent, the use of which has heretofore been considered to be advantageous in respect of yield and purity and has not been studied intensively, in the presence of an alkali metal hydroxide, e.g., sodium hydroxide, with controlling the reaction ratio of hydrazine within a predetermined range so that side reactions can be prevented, resulting in that alkali metal azides can be produced at high selectivities as high as, for example, about 95% based on the amount of hydrazine consumed.

The alkali metal azides produced can be obtained by concentrating the reaction solution in the conventional manner to precipitate crystals, which can be isolated readily by filtration, and mere drying gives a high quality product having a purity of 99% weight or higher. The filtrate as it is can be recycled for use with adjusting the composition by replenishing hydrazine. This recycling results in increased yield of alkali metal azides as high as at least 90% based on the amount of hydrazine used.

We claim:

1. A method of producing an alkali metal azide by reacting hydrazine with an alkyl nitrite in a solvent in the presence of an alkali metal hydroxide, wherein said solvent is an aqueous solvent having a water content of 50% or more and reaction ratio of hydrazine is controlled within the range between 50% and 90%.

2. A method as claimed in claim 1, wherein said aqueous solvent has a water content within the range between 70% and 95%.

3. A method as claimed in claim 2, wherein said aqueous solvent has a water content within the range between 80% and 90%.

4. A method as claimed in any one of claims 1, 2 and 3, wherein said reaction ratio of hydrazine is controlled within the range between 55% and 80%.

5. A method as claimed in claim 4, wherein said reaction ratio of hydrazine is controlled within the range between 60% and 75%.

* * * * *